United States Patent [19]

Tinholt

[11] 4,073,370
[45] Feb. 14, 1978

[54] VISCOUS FAN DRIVE ASSEMBLY ARRANGEMENT

[75] Inventor: Thomas H. Tinholt, Marshall, Mich.

[73] Assignee: Eaton Corporation, Cleveland, Ohio

[21] Appl. No.: 738,196

[22] Filed: Nov. 3, 1976

[51] Int. Cl.² .............................................. F16D 35/00
[52] U.S. Cl. ............................ 192/58 B; 192/DIG. 1; 60/458
[58] Field of Search ............. 192/58 B, 58 R, DIG. 1; 60/458

[56] References Cited

U.S. PATENT DOCUMENTS

| | | | |
|---|---|---|---|
| 1,493,513 | 5/1924 | Ziska | 192/DIG. 1 |
| 3,263,783 | 8/1966 | Sutaruk | 192/58 B |
| 4,013,154 | 3/1977 | Brown | 192/58 B |

*Primary Examiner*—Edgar W. Geoghegan
*Attorney, Agent, or Firm*—Teagno & Toddy

[57] ABSTRACT

A fluid coupling adapted to be attached to a pulley assembly which includes a pulley member and a hub having a set of external threads. The fluid coupling includes an output coupling member, an input coupling member rotatably disposed within a fluid chamber containing a volume of viscous fluid whereby torque is transmitted from the input coupling member to the output coupling member in response to relative rotation therebetween. The input coupling member includes an input shaft having a boss portion adjacent the rear surface of the output coupling member. The boss portion defines a set of internal threads for threaded engagement with the hub. The boss portion also defines a radial aperture and the output coupling member defines a slot disposed radially outward from the aperture and adjacent thereto. Both the aperture and the slot are adapted to receive an elongated tool such that rotating the output coupling member in either direction rotates the input coupling member and the boss portion in the same direction to thread the boss portion onto the hub during assembly, or unthread the boss portion from the hub to permit repair of either the fluid coupling or a device on which the coupling is mounted, such as the engine water pump.

7 Claims, 3 Drawing Figures

VISCOUS FAN DRIVE ASSEMBLY ARRANGEMENT

BACKGROUND OF THE DISCLOSURE

The present invention relates to torque transmitting fluid couplings, and more particularly, to such fluid couplings which are mounted on threaded hubs.

Conventionally, fluid couplings of the type to which the present invention relates have included an output coupling member defining a fluid chamber, an input coupling member rotatably disposed within the fluid chamber and a quantity of viscous fluid contained in the fluid chamber such that rotation of the input coupling member transmits torque to the output coupling member by means of viscous shear stress. The input coupling member is typically mounted on an input shaft, with the opposite end of the input shaft attached to some type of input drive member such as a flange associated with the engine water pump (U.S. Pat. No. 3,603,331), or a pulley driven by the engine crankshaft through one or more V-belts (U.S. Pat. Nos. 3,661,237 and 3,899,059, assigned to the assignee of the present invention).

As will be noted from a review of the above-cited patents, it has been common practice in the art to provide ample axial separation between the pulley and the fluid coupling to facilitate access to the bolts and nuts used to attach the input shaft flange to the pulley. However, as the trend toward compact and subcompact automobiles has developed, it has become necessary to reduce the size of many of the engine accessory components, and especially the axial dimensions thereof. This has also been true in the case of fluid couplings used in automotive applications as the drive for the vehicle radiator cooling fan.

The attempts at shortening the axial length of the entire water pump-pulley-fluid coupling assembly have included the arrangement illustrated in U.S. Pat. No. 3,263,783, assigned to the assignee of the present invention. The assembly arrangement shown in the cited patent uses an externally threaded hub and an internally-threaded, hexagonal, enlarged portion on the input shaft. This arrangement permits assembly and disassembly of a fluid coupling from the water pump by turning the enlarged portion, as by means of a large open-end or adjustable wrench. This arrangement has been generally satisfactory and is still in commercial use as of the filing date of the present application. However, with the arrangement shown in the cited patent, it is generally not possible to disassemble the fluid coupling from the threaded hub with conventional tools, thus making it difficult to perform many simple repairs on the water pump or the fluid coupling.

SUMMARY OF THE INVENTION

Accordingly, it is an object of the present invention to provide a fluid coupling and assembly arrangement therefore of the type having a substantially reduced axial length, but which requires no special tools to effect assembly and disassembly of the fluid coupling from a threaded hub.

It is also an object of the present invention to provide such a fluid coupling and assembly arrangement which, when desirable, may permit additional reduction in the axial separation between the water pump and the fluid coupling.

The above and other objects of the present invention are accomplished by the provision of a fluid coupling adapted to be mounted on a hub defining a first set of threads, the fluid coupling comprising a first rotatable member defining a fluid chamber and a second rotatable member disposed within the fluid chamber. The fluid chamber includes a volume of fluid for transmitting torque from one of the first and second members to the other of the members in response to relative rotation therebetween. The second member includes a shaft and a boss portion defining a second set of threads adapted to be in threaded engagement with the first set of threads defined by the hub. The boss portion defines a generally radially-extending aperture adapted to receive a connecting member therein and the first rotatable member includes means defining a slot disposed radially outward from the aperture and adjacent thereto. The slot-defining means is adapted to receive the connecting member therein when the connecting member is received in the aperture, thus making it possible to transmit a rotary motion of the first member into a rotary motion of the boss portion to affect threaded engagement or disengagement of the boss portion and the hub.

In accordance with another aspect of the present invention, the boss portion is disposed adjacent the rear surface of the first rotatable member and an input-output means (such as a fan or a pulley) is attached to the rear surface of the first member.

DESCRIPTION OF THE PREFERRED EMBODIMENT

Figure 1:
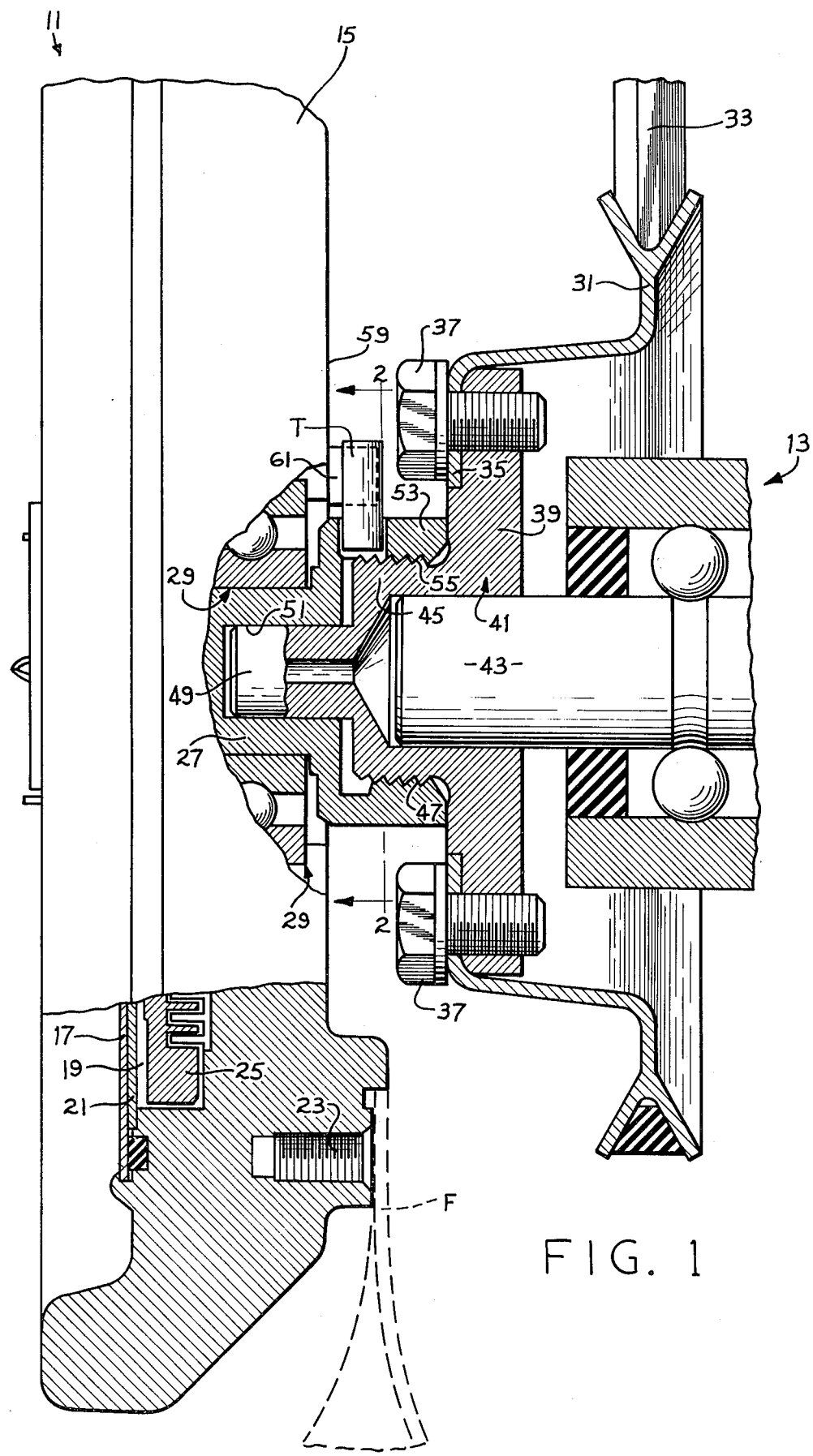
FIG. 1 is a fragmentary view of the fluid coupling and assembly arrangement of the present invention, partly in elevation and partly in axial cross section.

Referring now to the drawings, which are not intended to limit the present invention, FIG. 1 illustrates the preferred form of a fluid coupling device, generally designated 11, and an assembly arrangement by which the fluid coupling 11 may be mounted on a water pump, generally designated 13.

The fluid coupling 11 includes an output coupling member 15, which cooperates with a cover member 17 to define a fluid chamber. The fluid chamber is separated into a working chamber 19 and a reservoir chamber (not shown) by a valve plate 21. The fluid coupling 11 is shown herein as a drive for an automotive engine accessory, and specifically, as a drive for a vehicle radiator cooling fan. The fan (as represented by the dotted line labeled "F") is typically bolted to the output coupling member 15 utilizing a plurality of threaded bores 23 formed in the output member 15. It will be understood, however, that the use of the present invention is not limited to any particular fluid coupling configuration or application.

Disposed within the working fluid chamber 19 is an input coupling member 25 which, as is well known in the art, may be press fit onto an input shaft 27. The output coupling member 15 is mounted for rotation relative to the input shaft 27 by means of a suitable set of bearings 29. Thus, it will be appreciated that the output coupling member 15 turns freely relative to the input coupling member 25 and input shaft 27.

Disposed about the water pump 13 is a pulley member 31 which is driven by the engine crankshaft through a V-belt 33. The pulley 31 includes an annular portion 35 of reduced diameter which is attached, as by a plurality of bolts 37, to a flange portion 39 of a member 41 which is rotatably disposed about a stub shaft 43 protruding from the water pump 13.

The member 41 includes a hub portion 45 which defines a set of external threads 47. The member 41 also includes a cylindrical portion 49 of reduced diameter which is disposed within a generally cylindrical bore 51 defined by the input shaft 27.

The input shaft 27 includes an enlarged boss portion 53 defining a set of internal threads 55 which are in engagement with the external threads 47 of the hub portion 45. As may best be seen in FIG. 2, the boss portion 53 is preferably annular, partly for ease of manufacture. Therefore, because the input shaft 27 is free to turn relative to the output coupling member 15, as was mentioned previously, it is necessary to turn the boss portion 53 in order to either engage or disengage the internal threads 55 of the boss portion 53 and the external threads 47 of the hub portion 45. Although it may appear from the view of FIG. 1 that sufficient room is provided between the output coupling member 15 and the bolts 37 to turn the boss portion 53, it should be appreciated that the drawing figures in the present application are on a scale twice that of the actual commercial embodiment of the present invention.

Figure 2:
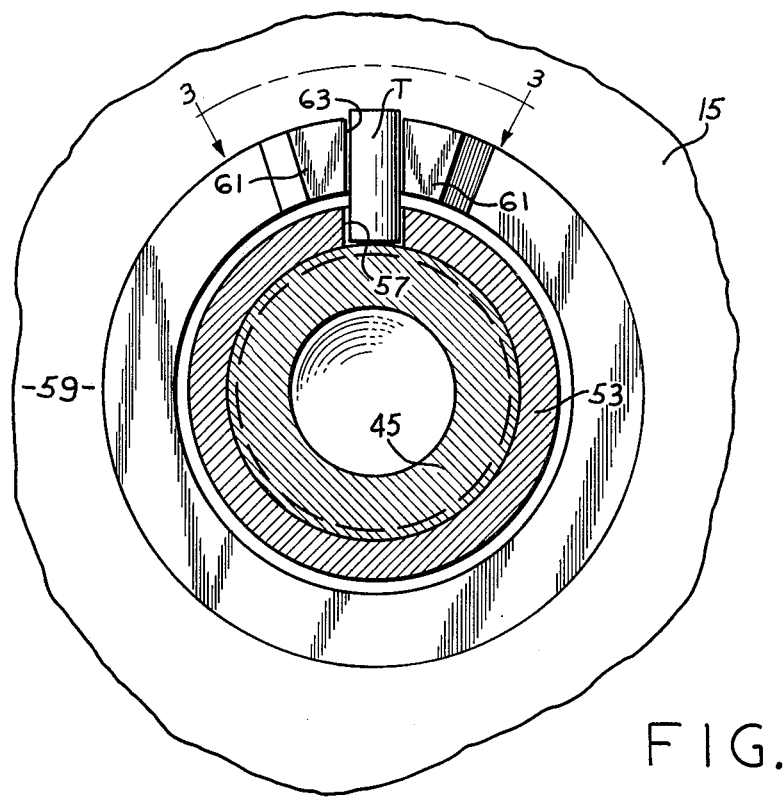
FIG. 2 is a transverse cross section taken on line 2—2 of FIG. 1.
Figure 3:
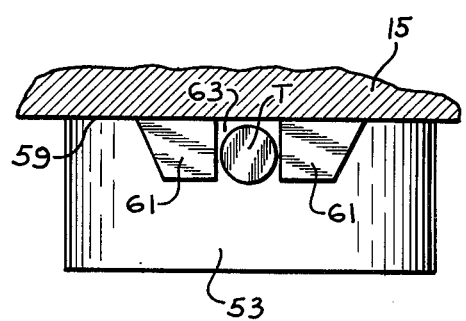
FIG. 3 is a fragmentary cross section taken on line 3—3 of FIG. 2.

Referring now to FIGS. 2 and 3, in conjunction with FIG. 1, the boss portion 53 defines an aperture or bore 57. The aperture 57 could, within the scope of the present invention, take many different forms but in the subject embodiment, the bore 57 is shown as a radially-extending drilled hole, extending completely through the annular wall of the boss portion 53. It is believed that the reason for this preferred configuration will become apparent subsequently.

Projecting outwardly from a rear surface 59 of the output coupling member 15 is a pair of tab portions 61, disposed to define a slot 63 therebetween. The slot 63 preferably has a width which is approximately the same as the diameter of the aperture 57. As was mentioned in regard to the aperture 57, the tab portions 61 and the slot 63 defined therebetween could all take various forms and configurations within the scope of the present invention. In the subject embodiment, the tab portions 61 are cast integrally with the output coupling member 15.

For purposes of subsequent discussion, it will be assumed that the fluid coupling 11 has been in operation and that for some reason it is now desired to remove the fluid coupling 11 from the water pump 13. In removing the fluid coupling 11, the first step is to manually rotate the output coupling member 15 to a position in which the slot 63 is disposed radially outward from the aperture 57 and adjacent thereto (as shown in FIGS. 1 and 2). Therefore, because the output coupling member 15 and input shaft 27 rotate relative to each other during normal operation, it should be understood that reference herein to the slot 63 being disposed radially outward from the aperture 57 and adjacent thereto is not intended to mean that such a spatial relationship always exists, but rather, that the slot 63 and aperture 57 may be so disposed when the output coupling member 15 is in a proper rotational alignment relative to the input shaft 27 and boss portion 53.

With the slot 63 aligned with the aperture 57, the next step is to insert a tool T such that one end of the tool is disposed in the aperture 57 while another portion of the tool is received in the slot 63. The output coupling member 15 and the input shaft 27 are now locked together so that rotary motion of one will be transmitted into rotary motion of the other, and the boss portion 53 may be unthreaded from the hub portion 45 by rotating the output coupling member in the appropriate direction, depending upon whether left-hand or right-hand threads are used. In the subject embodiment, the tool T is shown somewhat schematically as a relatively short, cylindrical member having a relatively close fit with both the slot 63 and the aperture 57. It will be understood, however, that in accordance with the objects of the invention, many different tool configurations may be utilized, and it is intended that the tool T will not be a special tool but will be something which is readily available to anyone wishing to do repair work on the fluid coupling or on the associated apparatus, whereby removal of the fluid coupling is necessary. For example, it is contemplated that the tool T might comprise the handle portion of a socket head wrench, and preferably, of the largest socket head wrench which will fit within both the slot 63 and aperture 57. It should be apparent that when the output coupling member 15 is being rotated to turn the boss portion 53, the torque-transmitting engagement of the tab portions 61 and boss portion 53 with the tool T will provide sufficient force to keep the tool from falling out when it is disposed 180 degrees from the position shown in FIGS. 1 and 2.

It will be appreciated that utilizing the arrangement of the present invention to install the fluid coupling 11 (or replace it) by threading the boss portion 53 onto the hub portion 45 will not differ substantially from the method just described for removing the fluid coupling, and in general, installation will be easier than removal. It is advisable, however, that when installing the fluid coupling, a tool of sufficient length be used to facilitate removal of the tool when the installation is complete.

It should be understood that the scope of the present invention is not limited to the subject embodiment in which the output coupling member has a fan attached thereto and the assembly arrangement of the present invention is associated with the input portion of the fluid coupling. Various other input-output means could be attached to the coupling member 15 and the member 41 could also be attached to various input-output devices. Accordingly, all such modifications and alterations are part of the present invention, insofar as they come within the scope of the appended claims.

I claim:

1. A fluid coupling adapted to be mounted on a hub defining a first set of threads, said fluid coupling comprising:
   (a) a first rotatable member defining a fluid chamber;
   (b) a second rotatable member disposed within said fluid chamber;
   (c) said fluid chamber including a volume of fluid for transmitting torque from one of said first and second members to the other of said first and second members in response to relative rotation therebetween;
   (d) said second rotatable member including an input shaft and a boss portion defining a second set of threads adapted to be in threaded engagement with the first set of threads defined by the hub;

(e) said boss portion defining a generally radially-extending aperture adapted to receive a connecting member therein; and (f) said first rotatable member including means defining a slot capable of being positioned radially outward from said aperture and adjacent thereto, said slot-defining means being adapted to receive said connecting member therein when said connecting member is received in said aperture to transmit a rotary motion of said first rotatable member into a rotary motion of said boss portion to selectively effect threaded engagement and disengagement of said boss portion and the threaded hub.

2. A fluid coupling as claimed in claim 1 wherein the threads on the hub are external threads, said boss portion is generally annular and said second set of threads is internal.

3. A fluid coupling as claimed in claim 1 wherein said boss portion is disposed adjacent a rear surface of said first rotatable member and an input-output means is attached to said rear surface of said first rotatable member.

4. A fluid coupling device as claimed in claim 3 wherein said input-output means comprises a vehicle radiator cooling fan assembly.

5. A fluid coupling adapted to be attached to a pulley assembly including a pulley member and a hub defining a set of external threads, said fluid coupling comprising:

(a) an output coupling member defining a fluid chamber;

(b) an input coupling assembly including an input coupling member rotatably disposed within said fluid chamber;

(c) said fluid chamber including a volume of viscous fluid for transmitting torque from said input coupling assembly to said output coupling member by means of viscous shear stress in response to relative rotation therebetween;

(d) said input coupling assembly including an input shaft including a boss portion defining a set of internal threads adapted for threaded engagement with the external threads on the hub;

(e) said boss portion defining a generally radially-extending aperture adapted to receive an elongated tool therein; and (f) said output coupling member including means defining a slot disposed radially outward from said aperture and adjacent thereto when said output coupling member is rotatably aligned relative to said input coupling member, said slot being adapted to receive said tool therein when an end of said tool is disposed in said radial aperture to transmit rotary motion of said output coupling member in either direction into rotary motion of said input coupling assembly and said boss portion to selectively effect threaded engagement and disengagement of said boss portion and the threaded hub.

6. A fluid coupling as claimed in claim 5 wherein said boss portion is generally annular and is disposed adjacent the rear surface of said output coupling member.

7. A fluid coupling as claimed in claim 5 including a vehicle radiator cooling fan assembly attached to the rear surface of said output coupling member.

* * * * *